(12) United States Patent
Park

(10) Patent No.: US 7,990,483 B2
(45) Date of Patent: Aug. 2, 2011

(54) STEREOSCOPIC IMAGE DISPLAY APPARATUS

(75) Inventor: In-Kyu Park, Seoul (KR)

(73) Assignee: 3DIS Co., Ltd. (KR)

( * ) Notice: Subject to any disclaimer, the term of this patent is extended or adjusted under 35 U.S.C. 154(b) by 7 days.

(21) Appl. No.: 12/161,808

(22) PCT Filed: Jan. 23, 2007

(86) PCT No.: PCT/KR2007/000399
§ 371 (c)(1),
(2), (4) Date: Jul. 23, 2008

(87) PCT Pub. No.: WO2007/083981
PCT Pub. Date: Jul. 26, 2007

(65) Prior Publication Data
US 2010/0220251 A1    Sep. 2, 2010

(30) Foreign Application Priority Data
Jan. 23, 2006  (KR) .......................... 10-2006-0007028

(51) Int. Cl.
G02F 1/1335  (2006.01)
(52) U.S. Cl. .............................. 349/15; 349/106; 349/96
(58) Field of Classification Search .................. 349/15, 349/16, 11, 1, 41, 106, 104, 96, 97, 122, 349/193, 194; 359/465
See application file for complete search history.

(56) References Cited

U.S. PATENT DOCUMENTS

| 6,320,629 | B1 * | 11/2001 | Hatano et al. ................ 349/15 |
| 6,590,605 | B1 * | 7/2003 | Eichenlaub ................ 348/51 |
| 7,058,252 | B2 * | 6/2006 | Woodgate et al. ............ 385/16 |
| 7,342,721 | B2 * | 3/2008 | Lukyanitsa .................. 359/462 |
| 7,609,330 | B2 * | 10/2009 | Kim .............................. 349/15 |
| 2005/0146787 | A1 * | 7/2005 | Lukyanitsa ................ 359/462 |
| 2005/0185275 | A1 | 8/2005 | Jang et al. ..................... 359/465 |
| 2006/0146208 | A1 * | 7/2006 | Kim .............................. 349/15 |

FOREIGN PATENT DOCUMENTS

| KR | 1020050056068 | 6/2005 |
| WO | WO 2006/009381 | 1/2006 |

* cited by examiner

*Primary Examiner* — Brian M Healy
(74) *Attorney, Agent, or Firm* — Park & Associates IP Law, P.C.

(57) ABSTRACT

A stereoscopic image display apparatus employing a front type parallax barrier is provided which can reduce a visible distance. The stereoscopic image display apparatus includes: a 2D image LCD panel having a first substrate in which a rear polarizing film is stacked on the rear surface thereof and a first switching element layer is stacked on the front surface thereof, a second substrate on which a color filter layer is stacked, and a first liquid crystal layer interposed between the first switching element layer and the color filter layer; a parallax barrier having a third substrate in which a front polarizing film is stacked on the front surface thereof and a transparent electrode layer is stacked on the rear surface thereof, a protective film, and a second liquid crystal layer interposed between the transparent electrode layer and the protective film; and an intermediate polarizing film interposed between the protective film of the parallax barrier and the second substrate of the 2D image LCD panel.

4 Claims, 4 Drawing Sheets

PRIOR ART

STEREOSCOPIC IMAGE DISPLAY APPARATUS

TECHNICAL FIELD

The present invention relates to a stereoscopic image display apparatus, and more particularly, to a stereoscopic image display apparatus employing a front type parallax barrier which can reduce a visible distance.

BACKGROUND ART

Methods of displaying a stereoscopic image include a method using polarizing spectacles and a method not using polarizing spectacles. The method using the polarizing spectacles is not widely used in stereoscopic image display apparatuses because of inconvenience resulting from the ware of spectacles and dangerousness of opthalmology diseases. The method not using the polarizing spectacles is classified into a lenticular method, a holographic method, and a parallax barrier method. Since the lenticular method and the holographic method have complicated structures and require high cost, they are used for only particular applications. The parallax barrier method has been most actively studied, developed, and commercialized.

The principle of the parallax barrier method was suggested in the early 20th century, but development of stereoscopic image display apparatuses using the parallax barrier method was regularized since flat panel display apparatuses such as liquid crystal display apparatuses, plasma display panels, and organic EL display apparatuses appeared. These days, rear type parallax-barrier stereoscopic image display apparatuses are supplied to the market. The rear type parallax-barrier stereoscopic image display apparatus means a stereoscopic image display apparatus having a structure in which a parallax barrier is disposed in the front of an image display panel.

The past rear type parallax-barrier stereoscopic image display apparatus has problems with low brightness, complicated manufacturing processes, high cost, and the like.

In order to solve the problems of the past rear type parallax-barrier stereoscopic image display apparatuses, development of front type parallax-barrier stereoscopic image display apparatuses has been attempted. However, the front type parallax-barrier stereoscopic image display apparatuses have a problem with a large visible distance (distance where a stereoscopic image is visible). For this reason, the front type parallax-barrier stereoscopic image display apparatuses were not commercialized, in spite of their merits of simple manufacturing processes and high brightness. The inventor of the present invention first suggests a front type parallax-barrier stereoscopic image display apparatus which can be commercialized. In other words, the front type parallax-barrier stereoscopic image display apparatus was not known in the art hitherto. However, the past trials of the inventor are called a prior art for the purpose of convenient explanation.

Hereinafter, problems of the past front type parallax-barrier stereoscopic image display apparatus are described with reference to the drawings.

FIG. 1 is a sectional view schematically illustrating a general 2D image liquid crystal display (LCD) panel.

A 2D image LCD panel 10 includes a first substrate 12 in which a rear polarizing film 11 is stacked on the rear surface thereof and a first switching element layer 13 is stacked on the front surface thereof and a second substrate 16 in which a color filter layer 15 is stacked on the rear surface thereof and a front polarizing film 18 is stacked on the front surface thereof. Here, a liquid crystal layer 14 is interposed between the first switching layer 13 and the color filter layer 15.

A thin film transistor (TFT) LCD panel can be used as the 2D image LCD panel 10. In this case, first switching elements of the first switching element layer 13 are TFTs. The structure and operations of the TFT LCD panel are known widely in the art and thus are described in brief.

The rear polarizing film 11 serves to polarize white light emitted from a backlight (not shown). The first and second substrates 12 and 16 are made of glass. The first substrate 12 serves as a base layer of the first switching element layer 13 and a pixel electrode layer (not shown). The TFTs are arranged in a matrix in the first switching element layer 13. An image (2D image) is displayed by driving the TFTs in accordance with an image signal. Although not shown, the pixel electrode layer made of ITO or the like is disposed under the first switching element layer 13.

The second substrate 16 serves as a base layer for forming the color filter layer 15 and the like and serves to mechanically protect the liquid crystal from external impacts. The second substrate 16 also serves to prevent oxygen and moisture from permeating the liquid crystal from the outside. Accordingly, the second substrate is made of a thick glass material with a thickness of 0.5 to 0.7 mm.

In the color filter layer 15 formed in the back of the second substrate 16, RGB color filters are arranged in a predetermined pattern.

Although not shown in the figures, a common electrode layer made of ITO or the like is disposed under the color filter layer 15. By applying a voltage between the pixel electrode layer and the common electrode layer through a wire 17, the liquid crystal molecules are aligned and an image is displayed by turning on or off the individual switching elements of the first switching element layer 13.

As described above, a first liquid crystal layer 14 made of liquid crystal is interposed between the first switching element layer 13 and the color filter layer 15, that is, between the first switching element layer 13 and the common electrode layer. Although not shown, an alignment layer is provided to initially align the liquid crystal. Light passing through the first liquid crystal layer 14 has a predetermined color by means of the RGB color filters.

With this configuration, a 2D image is displayed on the 2D image display panel 10. On the other hand, the 2D image is divided into and displayed as a left-eye image and a right-eye image for use in the stereoscopic image display apparatus. Next, a general parallax barrier LCD panel is described with reference to FIG. 2.

FIG. 2 is a sectional view schematically illustrating a general parallax-barrier LCD panel.

Referring to FIG. 2, the parallax-barrier LCD panel 20 includes a third substrate in which a rear polarizing film 21 is stacked at least on the rear surface thereof and a transparent electrode layer 23 is stacked on the front surface thereof and a protective film 25. Here, a second liquid crystal layer 24 is interposed between the transparent electrode layer 23 and the protective film 25. On the other hand, a front polarizing film 28 is stacked on the protective film 25.

A plurality of transparent electrodes are arranged in a band shape in the transparent electrode layer 23. Similarly, a plurality of counter electrodes are arranged in the counter electrode layer so as to be opposed to the plurality of transparent electrodes. The liquid crystal molecules of the second liquid crystal layer 24 are aligned depending on a voltage applied between the transparent electrodes and the counter electrodes through a wire 27. Light incident from the TFT LCD panel is blocked or transmitted depending on the alignment of the liquid crystal molecules. Accordingly, the liquid crystal layer serves as a parallax barrier.

Such a band-shaped member having a light blocking/transmitting function is called a parallax barrier. The parallax barrier allow an observer to view a stereoscopic image by allowing the left-eye image and the right-eye image displayed on the 2D image LCD panel 10 to be incident on the left eye and the right eye, respectively.

The parallax-barrier LCD panel 20 can be embodied as an LCD panel employing TN (Twisted Nematic) liquid crystal. Alternatively, the parallax-barrier LCD panel 20 may employ STN (Super-Twisted Nematic) liquid crystal or FTN (Film Compensated super twisted Nematic) liquid crystal.

Here, the protective film 25 is formed of a thick layer so as to protect the liquid crystal layer and to endure external impacts. Typically, the thickness of the protective film 25 is in the range of 0.55 to 1.1 mm.

FIG. 3 is a sectional view schematically illustrating a known stereoscopic image display apparatus.

In the past stereoscopic image display apparatus, the parallax-barrier LCD panel 20 is attached to the front surface of the 2D image LCD panel 10. The stereoscopic image display apparatus having such a structure is called a front type parallax-barrier stereoscopic image display apparatus.

Referring to FIG. 3, the known stereoscopic image display apparatus can be formed by bonding the front surface (front polarizing film 18) of the 2D image LCD panel 10 shown in FIG. 1 and the rear surface (rear polarizing film 21) of the parallax-barrier LCD panel 20 shown in FIG. 2 to each other. However, since the front polarizing film 18 and the rear polarizing film 21 perform the same operation, one thereof can be omitted. The polarizing film is shown as an intermediate polarizing film 18' in FIG. 3.

Now, a visible distance of the known stereoscopic image display apparatus having the above-mentioned structure will be described.

In FIG. 3, a distance e between an image and the parallax barrier corresponds to a distance from the first liquid crystal layer 14 to the second liquid crystal layer 24. As shown in the figure, the color filter layer 15, the second substrate 16, the intermediate polarizing film 18', the third substrate, and the transparent electrode layer 23 are interposed between the first liquid crystal layer 14 and the second liquid crystal layer 24. Here, since the color filter layer 15 is a very thin film (for example, chrome-deposited film) deposited on the second substrate, the thickness of the color filter layer 15 need not be considered in calculating the distance e between the image and the parallax barrier. Similarly, since the ITO layer, etc. formed on the protective film are very thin, they are collectively called a protective layer. At the time of calculating the distance e between the image and the parallax barrier, it is assumed that the thickness of the color filter layer 15 is included in the thickness of the second substrate 16.

In a stereoscopic image display apparatus for a monitor, typically, the second substrate 16 has a thickness of about 0.7 mm, the intermediate polarizing film 18' has a thickness of about 0.3 mm, and the third substrate 22 has a thickness of about 0.7 mm. The total thickness is about 1.7 mm. In a stereoscopic image display apparatus for a mobile terminal, typically, the second substrate 16 has a thickness of about 0.5 mm, the intermediate polarizing film 18' has a thickness of 0.1 to 0.3 mm, and the third substrate 22 has a thickness of about 0.5 mm. The total thickness is about 1.3 mm. Accordingly, the distance e between the image and the parallax barrier cannot be smaller than 1.3 mm.

An observer can recognize a stereoscopic image by placing both eyes at points on which the stereoscopic image is focused. A distance between the points at which the stereoscopic image is focused is defined as a visible distance L.

The visible distance L is determined based on the distance e between the image and the parallax barrier, an inter-eye distance E, and a pixel width P, and is expressed by Expression 1.

$$L \sim e(E/P) \quad (1)$$

Here, the inter-eye distance E is a distance between a left eye and a right eye, which varies by persons. An average inter-eye distance is about 6.5 cm. The pixel width P is a distance between pixels of an image display apparatus and is reversely proportional to the visible distance L as can be seen from Expression 1. The decrease in pixel width increases the resolution of an image but increases the visible distance. That is, the pixel width has a trade-off relation with the visible distance. In general, an image display apparatus for a monitor has a pixel width of about 100 μm and an image display apparatus for a personal mobile terminal has a pixel width of about 60 μm.

When the distance e between the image and the parallax barrier is substituted into Expression 1, the visible distance of the stereoscopic image display apparatus for a monitor is about 1.1 m and the visible distance of the stereoscopic image display apparatus for a mobile terminal is about 1.3 m. In this way, the front type parallax-barrier stereoscopic image display apparatus has a visible distance of about 1.2 m.

"That the visible distance is 1.2 m means that an observer can recognize a stereoscopic image with a distance of 1.2 m from the image display apparatus.

When the front type parallax-barrier stereoscopic image display apparatus is applied to a TV set, an observer is sufficiently spaced apart from the screen. Accordingly, the visible distance of 1.2 m causes no problem.

However, when the front type parallax-barrier stereoscopic image display apparatus is applied to a computer monitor, the visible distance of 1.2 m causes a serious problem. For example, when a gamer (observer) play a 3D game while viewing a computer monitor, the gamer should input commands by the use of a keyboard or a joy stick while viewing the screen. Since a person's average arm length is generally 70 cm or less, the gamer cannot play the game at the same time as recognizing the stereoscopic image.

When the front type parallax-barrier stereoscopic image display apparatus is applied to a mobile terminal such as a mobile phone or a PDA, the visible distance of 1.2 m also causes a serious problem. That is, it is not possible to enjoy a stereoscopic game service or confirm stereoscopic image information at the same time of recognizing a stereoscopic image by the use of a mobile terminal. Since the screen of the mobile terminal is small, it is not possible to recognize an image by employing the front type parallax-barrier stereoscopic image display apparatus.

The visible distance L required for the mobile terminal is in the range of 30 to 40 cm. Accordingly, even when a diamond zone (which is described later) of 40 to 90 cm of a mobile terminal is considered, it is not possible to view a desired stereoscopic image by the use of the known front type parallax-barrier stereoscopic image display apparatus.

DISCLOSURE OF THE INVENTION

Technical Goal

The invention is contrived to solve the above-mentioned problems. A goal of the invention is to provide a stereoscopic image display apparatus employing a front type parallax barrier which can reduce a visible distance.

Technical Solution

According to an aspect of the invention, there is provided a stereoscopic image display apparatus including: a 2D image LCD panel having a first substrate in which a rear polarizing film is stacked on the rear surface thereof and a first switching element layer is stacked on the front surface thereof, a second substrate on which a color filter layer is stacked, and a first liquid crystal layer interposed between the first switching element layer and the color filter layer; a parallax barrier having a third substrate in which a front polarizing film is stacked on the front surface thereof and a transparent electrode layer is stacked on the rear surface thereof, a protective film, and a second liquid crystal layer interposed between the transparent electrode layer and the protective film; and an intermediate polarizing film interposed between the protective film of the parallax barrier and the second substrate of the 2D image LCD panel.

The 2D image LCD panel may be a TFT liquid crystal display panel.

The parallax barrier may be a TN liquid crystal display panel.

The parallax barrier may be a STN liquid crystal display panel.

The parallax barrier may be an FSTN liquid crystal display panel.

The thickness of the protective film may be about 0.3 mm or less (in the range of 0.1 mm to 0.3 mm).

DESCRIPTION OF EXEMPLARY EMBODIMENTS

Hereinafter, a stereoscopic image display apparatus according to an embodiment of the invention will be described in detail with reference to the accompanying drawings.

Figure 4:
FIG. 4 is a sectional view schematically illustrating a stereoscopic image display apparatus according to an embodiment of the invention.

FIG. 4 is a sectional view schematically illustrating a stereoscopic image display apparatus according to an embodiment of the invention. In the stereoscopic image display apparatus, a parallax barrier liquid crystal display (LCD) panel is disposed in the front of a 2D image LCD panel. The stereoscopic image display apparatus having such a structure is called a front type parallax-barrier stereoscopic image display apparatus.

The 2D image LCD panel includes a first substrate 120 in which a rear polarizing film 110 is stacked at least on the rear surface thereof and a first switching element layer 130 is stacked on the front surface thereof, a second substrate 220 having a color filter layer 150 stacked thereon, and a first liquid crystal layer 140 interposed between the first switching element layer 130 and the color filter layer 150.

The 2D image LCD panel 100 can employ preferably a TFT LCD panel. In this case, first switching elements of the first switching element layer 130 are TFTs. Here, the 2D image LCD panel 100 may be one of TN (Twisted Nematic), STN (Super-Twisted Nematic), FSTN (Film compensated Super Twisted Nematic), HTN (Hybrid Twisted Nematic), and CSTN (Color Super Twisted Nematic) liquid crystal display panels. The structure, the operations, and the types of the TFT LCD panel are widely known in the art and thus detailed description thereof will be omitted.

The rear polarizing film 110 serves to polarize white light emitted from a backlight (not shown). The first substrate 120 is made of glass and serves as a base layer of the first switching element layer 130 and a pixel electrode layer (not shown). The TFTs are arranged in a matrix pattern in the first switching element layer 130. An image (2D image) is displayed by activating the TFTs in accordance with an image signal. Although not shown in the figure, a pixel electrode layer made of ITO or the like is disposed under the first switching element layer 130.

RGB color filters are arranged in a predetermined pattern in the color filter layer 150.

Although not shown in the figure, a common electrode layer made of ITO or the like is disposed under the color filter layer 150. A voltage is applied between the pixel electrode layer and the common electrode layer through a wire 170 to align liquid crystal molecules and an image is expressed by turning on or off the individual switching elements of the first switching element layer.

As described above, the first liquid crystal layer 140 including liquid crystal molecules is interposed between the first switching element layer 130 and the color filter layer 150, that is, between the first switching element layer 130 and the common electrode layer. Although not shown in the figure, an alignment film for aligning the liquid crystal molecules is provided.

Light passing through the first liquid crystal layer 140 has a predetermined color by means of the RGB color filters. With this configuration, a 2D image is displayed on the 2D image LCD panel 100. On the other hand, the 2D image is divided into and displayed as a left-eye image and a right-eye image for use in the stereoscopic image display apparatus.

The parallax barrier LCD panel 200 includes a third substrate in which a front polarizing film 210 is stacked at least on the front surface thereof and a transparent electrode layer 230 is stacked on the rear surface thereof, a protective film 250, and a second liquid crystal layer 240 interposed between the transparent electrode layer 230 and the protective film 250. A counter electrode layer (not shown) is disposed on the protective film 250.

A plurality of transparent electrodes are arranged in a band shape in the transparent electrode layer 230. Similarly, a plurality of counter electrodes are arranged in the counter electrode layer so as to be opposed to the plurality of transparent electrodes. The liquid crystal molecules of the second liquid crystal layer 240 are aligned with a voltage applied between the transparent electrodes and the counter electrodes through a wire 270. Light incident from the TFT LCD panel is blocked or transmitted depending on the alignment of the liquid crystal molecules.

Such a band-shaped member having a light blocking/transmitting function is called a parallax barrier. The parallax barrier allow an observer to view a stereoscopic image by allowing the left-eye image and the right-eye image displayed on the 2D image LCD panel 100 to be incident on the left eye and the right eye, respectively.

The parallax-barrier LCD panel 200 can be embodied as an LCD panel employing TN liquid crystal. Alternatively, the parallax-barrier LCD panel 200 may employ one LCD panel of STN, FSTN, HTN, and CSTN liquid crystal display panels or may be of a film type having a predetermined pattern. Such an LCD panel can be put into practice by those skilled in the art and thus detailed description thereof will be omitted.

In the stereoscopic image display apparatus according to an embodiment of the invention having the above-mentioned configuration, the protective film 250 need not be formed of a thick layer.

Figure 1:
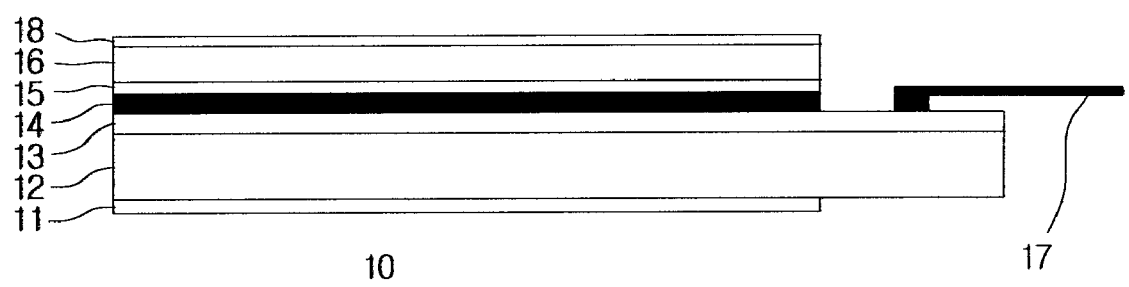
FIG. 1 is a sectional view schematically illustrating a general 2D image liquid crystal display panel.
Figure 2:
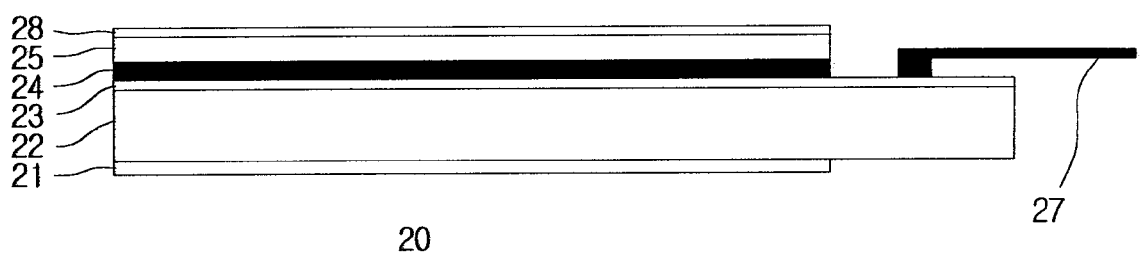
FIG. 2 is a sectional view schematically illustrating a general parallax-barrier liquid crystal display panel.
Figure 3:
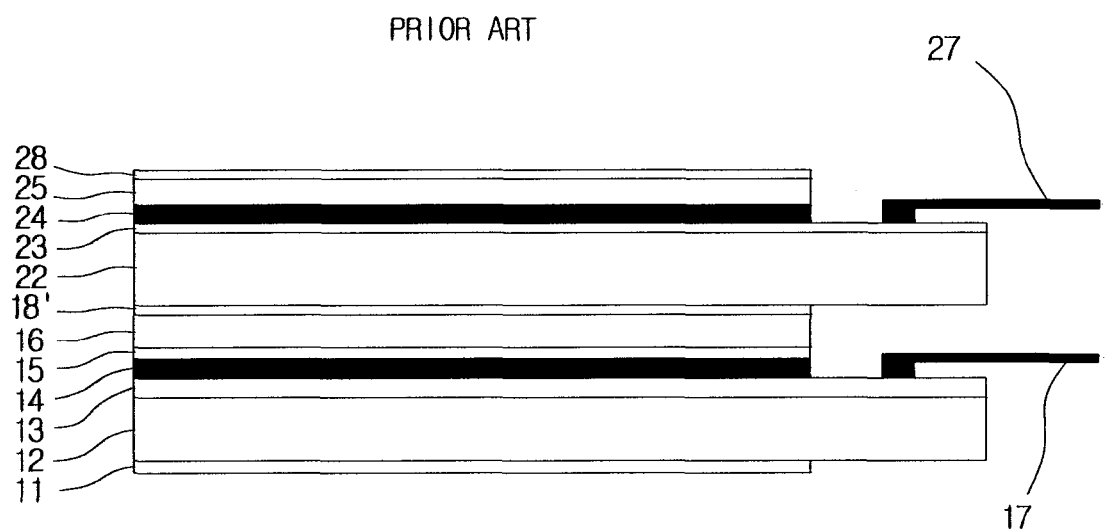
FIG. 3 is a sectional view schematically illustrating a known stereoscopic image display apparatus.

As described above, in the past stereoscopic image display apparatus, since the protective film 25 disposed as the upper layer of the stereoscopic image display apparatus (see FIG. 3) can endue external impacts, the protective film is formed of a thick layer. Typically, the thickness of the past protective film 25 is in the range of 0.55 to 1.1 mm. However, the protective film 250 according to an embodiment of the invention is disposed as an intermediate layer of the stereoscopic image display apparatus. In other words, the protective film according to the embodiment of the invention need not be formed thick enough to endure external impacts. The external impacts are prevented by the second substrate 220. Accordingly, the protective film 250 according to the invention may be embodied with a thickness of 0.3 mm or less.

In FIG. 4, a distance e between an image and a parallax barrier corresponds to a distance from the first liquid crystal layer 140 to the second liquid crystal layer 240. As shown in the figure, the color filter layer 150, the second substrate 160, the intermediate polarizing film 180', and a protective film 250 are interposed between the first liquid crystal layer 140 and the second liquid crystal layer 240. Compared with the prior art shown in FIG. 3, in the stereoscopic image display apparatus according to the embodiment of the invention, a thin protective film 250 instead of the third substrate 22 in the prior art is interposed between the first liquid crystal layer 140 and the second liquid crystal layer 240. The wire 270 of the parallax-barrier LCD panel 200 is disposed in the third substrate 220 formed on the front side. As can be seen from FIG. 4, in the stereoscopic image display apparatus according to the embodiment of the invention, since the wire 270 of the parallax-barrier LCD panel 200 is disposed in the third substrate 220 formed on the front side, the distance from the wire 170 of the 2D image LCD panel 100 is further increased, thereby further preventing the short circuit between the wires.

The thickness of the third substrate in the prior art is about 0.7 mm for a monitor and about 0.5 mm for a mobile terminal. The thickness of the protective film 250 of the embodiment of the invention is about 0.3 mm or less.

Accordingly, according to the embodiment of the invention, when the stereoscopic image display apparatus is embodied for a monitor, the thickness of the second substrate 160 is about 0.7 mm, the thickness of the intermediate polarizing film 180' is about 0.1 mm, and the thickness of the protective film 250 is about 0.3 mm. The total thickness is about 1.1 mm. Accordingly, the distance e between the image and the parallax barrier is about 1.1 mm. When the thickness is substituted into Expression 1, the visible distance L of the stereoscopic image display apparatus for the monitor according to the embodiment of the invention is about 70 cm.

On the other hand, according to the embodiment of the invention, when the stereoscopic image display apparatus is embodied for a mobile terminal, the thickness of the second substrate 160 is about 0.3 mm, the thickness of the intermediate polarizing film 180' is about 0.1 mm, and the thickness of the protective film 250 is about 0.3 mm. The total thickness is about 0.7 mm. Accordingly, the distance e between the image and the parallax barrier is about 0.7 mm. When the thickness is substituted into Expression 1, the visible distance L of the stereoscopic image display apparatus according to the embodiment of the invention is about 70 cm. On the other hand, 70 cm is a large distance. However, in the stereoscopic image display apparatus for a mobile terminal, the screen size is small and a focus is formed in the constant range of distance of 40 to 90 cm, which is called a "diamond zone." Since the visible distance of 70 cm of the stereoscopic image display apparatus for a mobile terminal belongs to the diamond zone, an observer can view a stereoscopic image. The diamond zone was first found out by the inventor through experiments.

In this way, in the stereoscopic image display apparatus according to the embodiment of the invention, it is possible to markedly reduce the visible distance, compared with the prior art. Accordingly, it is possible to commercialize the front type parallax-barrier stereoscopic image display apparatus which could not be commercialized in the past.

In the stereoscopic image display apparatus according to the embodiment of the invention, since the wire 270 of the parallax-barrier LCD panel 200 is disposed in the third substrate 200 formed on the front side, the distance from the wire 170 of the 2D image LCD panel 100 can be increased, thereby further preventing the short circuit between the wires.

INDUSTRIAL APPLICABILITY

According to the invention, it is possible to reduce the visible distance by reducing the distance between an image and a parallax barrier in the stereoscopic image display apparatus.

According to the invention, it is possible to easily manufacture the stereoscopic image display apparatus and reduce the manufacturing cost by removing an unnecessary stacked layer between the image and the parallax barrier.

While the invention has been described with reference to the exemplary embodiments, the invention is not limited to the embodiments, but it can be understood by those skilled in the art that the invention can be variously modified and altered without departing from the spirit and scope of the invention described in the attached claims.

The invention claimed is:

1. A stereoscopic image display apparatus comprising:
   a 2D image LCD panel having a first substrate in which a rear polarizing film is stacked on the rear surface thereof and a first switching element layer is stacked on the front surface thereof, a second substrate on which a color filter layer is stacked, and a first liquid crystal layer interposed between the first switching element layer and the color filter layer;
   a parallax barrier having a third substrate in which a front polarizing film is stacked on the front surface thereof and a transparent electrode layer is stacked on the rear surface thereof, a protective film, and a second liquid crystal layer interposed between the transparent electrode layer and the protective film; and
   an intermediate polarizing film interposed between the protective film of the parallax barrier and the second substrate of the 2D image LCD panel.

2. The stereoscopic image display apparatus according to claim 1, wherein the 2D image LCD panel is any one liquid crystal display panel of TN, STN, FSTN, HTN, and CSTN liquid crystal display panels.

3. The stereoscopic image display apparatus according to claim 1, wherein the parallax barrier is any one liquid crystal display panel of TN, STN, FSTN, HTN, and CSTN liquid crystal display panels or a film type.

4. The stereoscopic image display apparatus according to any one of claims 1 to 3, wherein the thickness of the protective film is in the range of 0.1 mm to 0.3 mm.

* * * * *